Aug. 26, 1969    J. GELB    3,463,021
COAXIAL SHAFT REVERSING DRIVE MECHANISM
Filed Aug. 4, 1967    2 Sheets-Sheet 1

John Gelb.
INVENTOR.

Aug. 26, 1969  J. GELB  3,463,021
COAXIAL SHAFT REVERSING DRIVE MECHANISM
Filed Aug. 4, 1967  2 Sheets-Sheet 2

John Gelb
INVENTOR.

United States Patent Office 3,463,021
Patented Aug. 26, 1969

3,463,021
COAXIAL SHAFT REVERSING DRIVE
MECHANISM
John Gelb, Van Nuys, Calif., assignor, by direct and mesne assignments, of forty-five percent to Allan Friedman and ten percent to Marvin Friedman, both of Los Angeles, Calif.
Filed Aug. 4, 1967, Ser. No. 659,287
Int. Cl. F16h 15/16, 13/12, 3/14
U.S. Cl. 74—202                                           6 Claims

ABSTRACT OF THE DISCLOSURE

The present invention is a reversing drive mechanism having an input shaft rotatably mounted at one end of a housing and an output shaft rotatably mounted at the other end of the housing. A plurality of pinions are mounted on the housing and a cone shaped ring is connected to the input shaft and in operative engagement with the plurality of pinions. A pair of disk shaped armature members are slidably mounted on the output shaft. An electromagnet is positioned between these armature members for selectively actuating each of the armature members. When one of the armature members is actuated, it contacts the cone shaped ring and the output shaft rotates in one direction. When the other armature member is actuated, it contacts the plurality of pinions and the output shaft rotates in the opposite direction. In another embodiment, a second cone shaped member is in contact with the plurality of pinions and the second mentioned armature member contacts it rather than the plurality of pinions for reversing the direction of output shaft rotation.

---

This invention relates to an electromagnetically actuated friction drive, rotation reversing mechanism. Since in almost all types of machinery it is often required to reverse, all or part, of the drive train direction of rotation, a device is needed to achieve this end, simply and with the least complexity and number of parts. The device described hereunder, fulfills these requirements. Ease of installation is assured due to the fact that this mechanism features coaxial input and output shafts and is symmetrical around its central axis. Therefore it can be installed either as an independent module or directly combined with the drive motor by flanging this unit on to the motor, where it would replace one of the motor endbells. This feature makes unnecessary shaft couplings and extra bearings and associated mounts with obvious advantages in lesser complexity and saving in cost. Since actuation is based on selective electric switching, either limit switches, actuated by the machine member to be operated, or remote controlled electric programed switching can be used. All this makes possible a very flexible control concept, on part of the user. Consequently a device such as described, contributes a valuable functional element to the art of machinery construction.

Other objects, advantages and novel features of the invention will become apparent from the following detailed description of the invention when considered in conjunction with the accompanying drawings wherein.

Figure 1:
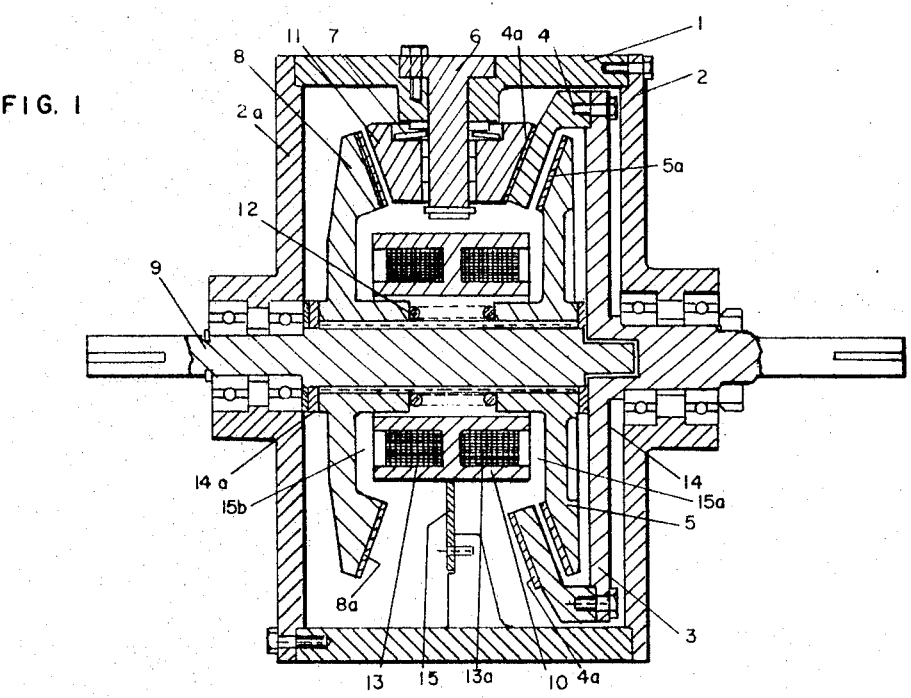
FIGURE 1 is a sectional view of one embodiment of the present invention.

Referring to FIGURES 1 and 2a main housing 1 with a straight through bore is provided at each end with end plates 2 and 2a which are fastened onto the housing 1. The input shaft 3 revolves in bearings located in end plate 2. The input shaft 3 carries on the opposite end from the coupling keyway an integral flange 3a. To this flange is bolted an open cone shaped ring 4. This ring is provided on its outer surface with a friction material facing 4a. Arranged in the main housing 1, on pinion shafts 6, 6a and 6b are three conical pinions 11, 11a and 11b. These pinions are spring biased by springs 7, 7a and 7b along the longitudinal direction of the respective pinion shaft. The output shaft 9 is coaxially aligned with the input shaft 3 and revolves in bearings located in end plate 2a. The output shaft 9 is provided with a splined center section. Located in the center of main housing 1 is a rigidly mounted electromagnet structure, consisting of a triangular member 15 which carries in its center a pole ring 10, formed to provide two active magnetic pole gaps 15a and 15b. Annular cavities in said pole ring 10 house two electrically independent magnet coils 13 and 13a. The operating magnet gaps 15a and 15b are facing towards the end covers 2 and 2a respectively. Slideably mounted on the output shaft 9 and located inside the open cone shaped ring 4, is a disk shaped armature member 5 which carries on its angular outer surface a friction material facing 5a. Also located in a slideable relation to the output shaft 9 and mounted on the opposite side of the stationary magnet structure, is a disk shaped armature member 8 which carries on its angular surface a friction material facing 8a. A spring 12 located concentrically with the output shaft 9 abuts against both armatures 5 and 8 and keeps them in contact with the thrust washers 14 and 14a located at both ends of the output shaft 9.

Figure 2:
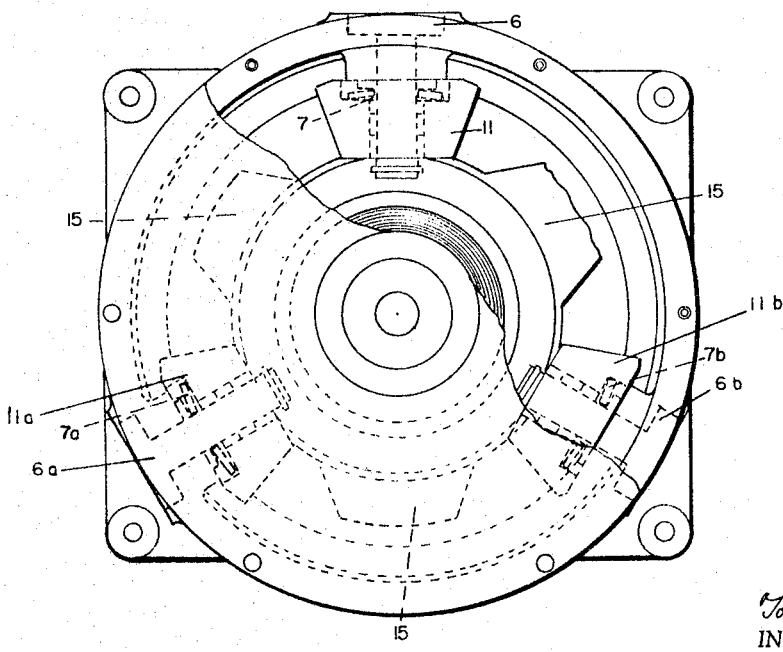
FIGURE 2 is a scale view, partly in section, of FIGURE 1.

The device shown in FIGURES 1 and 2 functions in the following manner.

Driven by a source of rotating power, the input shaft 3 with its integral flange 3a and open cone shaped ring 4, impart rotary motion to the three spring loaded pinions 11, 11a and 11b which are in frictional engagement with the cone shaped ring 4. Energizing coil 13a located in pole ring 10 creates a magnetic force in the pole ring gap 5a which attracts the disk shaped armature 5 that is positioned inside the cone shaped ring 4. Since armature 5 is slideably mounted on the output shaft 9 and is fitted with a friction material facing 5a on its outer surface, armature 5 comes into frictional engagement with the inside of the cone shaped ring 4, which will now impart rotation to armature 5 and therefore to the output shaft 9. In this mode of operation the direction of rotation of the output shaft will be identical with the direction of rotation of the input shaft 3.

Energizing the opposite magnet coil 13 creates a force in the pole ring gap 15b which attracts the disk shaped armature 8 to a position that is adjacent to the pole ring 10. Therefore armature 8 slides along the splined output shaft 9 until it contacts with its friction material facing 8a, the rotating pinions 11, 11a and 11b. Rotary motion is now imparted to armature 8. Since the pinions, which are driven by input shaft 3 and ring 4, rotate in the opposite sense of rotation to that of the input shaft, the driven armature 8 will now rotate in the opposite direction of rotation to that of the input shaft. This opposite sense of rotation will now be imparted to the output shaft.

Figure 3:
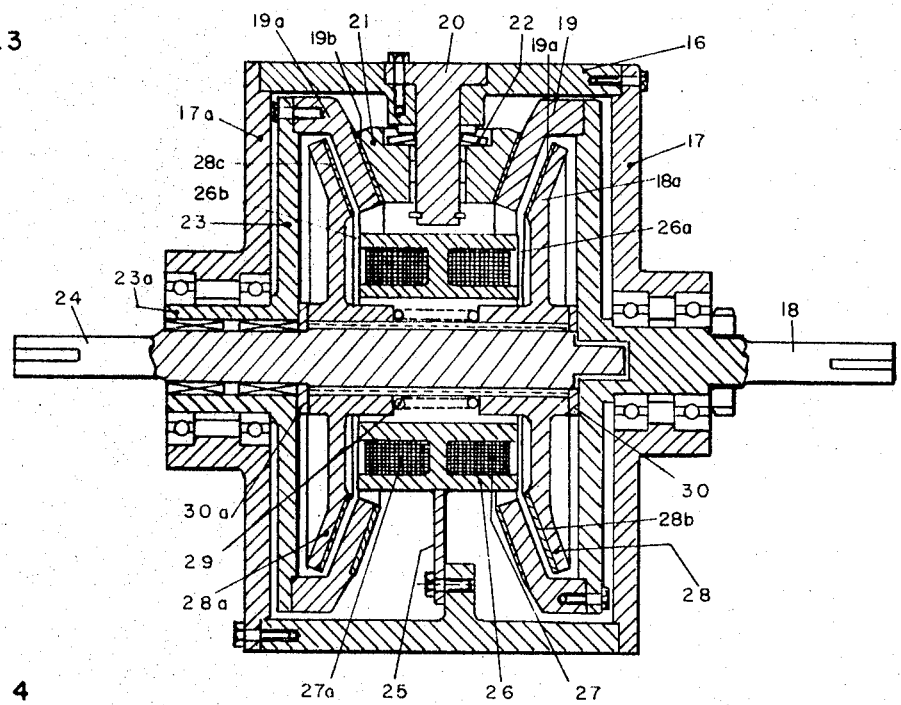
FIGURE 3 is a sectional view of another embodiment of the present invention.
Figure 4:
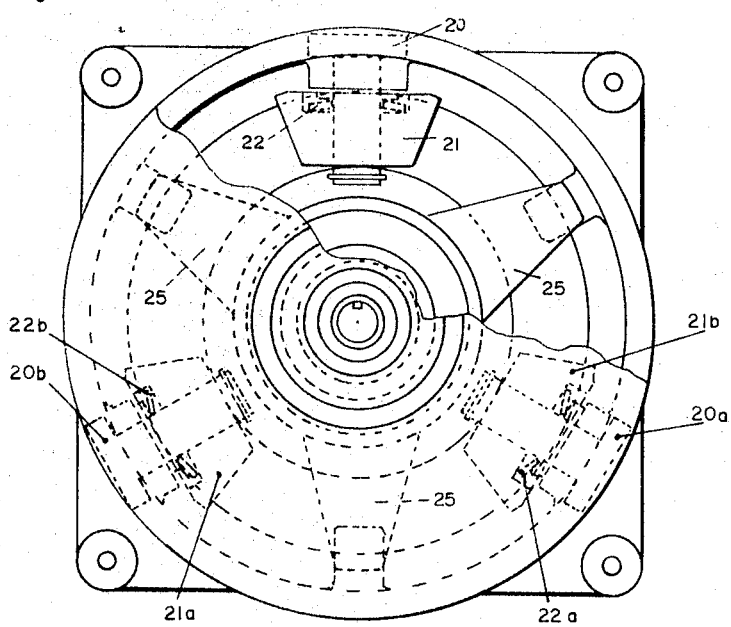
FIGURE 4 is a side view, partly in section, of FIGURE 3.

In FIGURES 3 and 4 is illustrated another embodiment of the present invention.

The outer structure of this embodiment comprises a main housing 16 with two endcovers 17 and 17a. The input shaft 18 is rotatably mounted on bearings in the end cover 17. The input shaft 18 is provided at one end with an integral flange 18a, to which is mounted an open cone shaped ring 19. This ring is faced on its outer surface with a friction material 19a. Mounted in the main housing 16 at right angle to the input shaft axis are three pinion shafts 20, 20a and 20b. Revolving on these pinion shafts are three pinions 21, 21a and 21b. Each of these pinions have circumferential contours of the same angularity as the open cone shaped ring 19. These pinions are spring loaded by springs 22, 22a and 22b in their axial direction. Rotatably mounted on bearings located in the end cover 17a is flange member 23 with an integral hub 23a to which is attached an open cone shaped ring 19a. This cone shaped ring is faced on its outer surface with a friction material 19b. The output shaft 24 is coaxially aligned with input shaft 18 and is piloted in said input shaft and revolves in bearings mounted in the flange hub 23a. The output shaft 24 is provided with a splined center section. Located in the center of the main housing 16 is a rigidly mounted electromagnet structure, consisting of a triangular support member 25 which carries in its center a pole ring 26, formed to provide two active magnetic pole gaps 26a and 26b. Annular cavities in the pole ring 26 house two electrically independent magnet coils 27 and 27a. The operating gaps 26a and 26b are facing toward the end covers 17 and 17a, respectively. Slideable mounted on the output shaft 24 and located inside the open cone shaped rings 19 and 19a are two independent disk shaped armatures 28 and 28a. The disk shaped armatures 28 and 28a have on their outer peripheral surface a friction material surface 28b and 28c. A spring 29 located centrically with the output shaft 24 abuts against the hubs of the disk shaped armatures 28 and 28a and keeps them in contact with the thrust washers 30 and 30a located at both extremities of the input shaft 24..

The device shown in FIGURES 3 and 4 functions in the following manner.

The input shaft, driven by a source of rotating power, drives its integral flange 18a and cone shaped ring 19 which is attached thereto. The cone shaped ring, being in frictional contact with the three housing mounted pinions 21, 21a and 21b, drives these pinions and set them into rotary motion. Flange member 23 is rotated by the rotation of pinions 21, 21a and 21b which are in contact with frictional material 19b of cone shaped ring 19a. The direction of rotation of flange hub 23a, flange member 23 and ring 19a is opposite to that of input shaft 18. When magnet coil 27 is energized, then disk shaped armature 28 is attracted toward magnetic pole gap 26a and slides to the left on the splines of output shaft 24 and compressor spring 29. In moving to the left, friction material surface 28b engages the inside face of cone shaped ring 19 and imparts motion through the splines to output shaft 24 so that it has the same direction of rotation as input shaft 18.

To reverse the direction of rotation of output shaft 24, magnet coil 27 is deenergized and magnet coil 27a is energized. When magnet coil 27 is deenergized, then the bias of spring 29 causes disk shaped armature 28 to slide on the splines of output shaft 24 to the right so that friction material surface 28b disengages from the inside face of cone shape ring 19 of armature 28. Because of this disengagement armature 28 no longer imparts rotation to output shaft 24. When magnet coil 27a is energized, then disk shaped armature 28a is attracted toward magnetic pole gap 26b, and slides to the right on the splines of output shaft 24 and compresses spring 29. In moving to the right friction material surface 28c engages the inside face of cone shaped ring 19a and imparts rotary motion through the splines to output shaft 24 so that it has a direction of rotation that is opposite to the direction of rotation of input shaft 18. To disengage input shaft 18 from output shaft 24, both magnet coils 27 and 27a are deenergized and the bias of spring 29 causes armature 28 to disengage from cone shaped ring 19 and armature 28a to disengage from cone shaped ring 19a.

Obviously, many modifications and variations of the present invention are possible in light of the above teachings.

What I claim is:

1. A reversing drive mechanism comprising:
a housing;
an input shaft rotatably mounted at one end of said housing;
an output shaft rotatably mounted at the other end of said housing and a section of said output shaft extending into said housing;
said input shaft and said output shaft being in coaxial alignment;
said input shaft having a ring attached thereto;
a plurality of pinions mounted on said housing;
said ring of said input shaft in operative engagement with said plurality of pinions;
a first disk shaped armature member slidably mounted on said section of said output shaft;
a second disk shaped armature member slidably mounted on said section of said output shaft;
means for engaging said first disk shaped armature member with said ring; and
means for engaging said second disk shaped armature member with said plurality of pinions.

2. The device of claim 1 wherein:
said ring is a cone shaped ring;
said section of said output shaft includes splines;
said first disk shaped armature member having splines in operative engagement with the splines of said section; and
said second disk shaped armature member having splines in operative engagement with the splines of said section.

3. The device of claim 2 comprising:
a spring mounted on said section of said output shaft between said first and second disk shaped armature members and biases said first and second disk shaped armature members away from each other.

4. The device of claim 1 wherein:
said means comprises an electromagnet.

5. The device of claim 1 wherein:
said ring is cone shaped and the cone face has a friction material facing in engagement with said plurality of pinions;
said first disk shaped armature member having friction material facing in engagement with said cone shaped ring; and
said second disk armature shaped member having a friction material facing in engagement with said plurality of pinions.

6. The device of claim 1 wherein:
said last mentioned means includes a second ring rotatably mounted on said housing in direct engagement with said pinions; and
whereby said second disk shaped armature member is selectively engaged with said second ring.

References Cited

UNITED STATES PATENTS

| 511,821 | 1/1894 | Trumpy | 74—210 XR |
| 619,152 | 2/1899 | Durr | 74—202 |
| 1,263,413 | 4/1918 | Holm-Hansen | 74—210 XR |
| 1,396,954 | 11/1921 | Geiger | 74—202 |
| 1,424,027 | 7/1922 | Murphy | 74—202 |
| 3,168,773 | 2/1965 | Frye | 74—215 XR |

FRED C. MATTERN, Jr, Primary Examiner

J. A. WONG, Assistant Examiner

U.S. Cl. X.R.

74—210, 379; 192—51, 84